(12) United States Patent
Bagley

(10) Patent No.: US 6,932,551 B1
(45) Date of Patent: Aug. 23, 2005

(54) WELDED CHAIN TRUCK RAIL

(76) Inventor: Gerald Bagley, 2927 Dunn Rd., Fayetteville, NC (US) 28312

( * ) Notice: Subject to any disclaimer, the term of this patent is extended or adjusted under 35 U.S.C. 154(b) by 0 days.

(21) Appl. No.: 10/817,167

(22) Filed: Apr. 5, 2004

(51) Int. Cl.⁷ ............................................ B61D 45/00
(52) U.S. Cl. .................. 410/106; 410/116; 296/41; 296/37.6
(58) Field of Search .............................. 296/41, 43, 32, 296/34, 36, 39.2, 37.6; 410/106, 110, 115, 410/116; 224/42.4, 568; D12/190, 406

(56) References Cited

U.S. PATENT DOCUMENTS

| | | | |
|---|---|---|---|
| 4,316,688 A * | 2/1982 | Roskelley | 410/102 |
| 4,604,013 A * | 8/1986 | Elwell et al. | 410/106 |
| 4,812,093 A * | 3/1989 | Millar, Jr. | 410/110 |
| 5,445,482 A * | 8/1995 | Davis | 410/115 |
| 5,704,678 A * | 1/1998 | Elwell et al. | 296/39.2 |
| 5,997,227 A * | 12/1999 | Bundy | 410/106 |
| 6,179,181 B1 * | 1/2001 | Johnson et al. | 224/405 |
| 6,286,884 B1 * | 9/2001 | Speece | 296/41 |
| 6,394,532 B1 * | 5/2002 | Dence | 296/165 |
| 6,474,616 B2 * | 11/2002 | Yamada et al. | 248/503.1 |
| 2002/0012576 A1 * | 1/2002 | Anderson | 410/106 |

* cited by examiner

Primary Examiner—D. Glenn Dayoan
Assistant Examiner—Greg Blankenship
(74) Attorney, Agent, or Firm—Mills Law Firm PLLC

(57) ABSTRACT

A truck rail for the side walls of a pickup truck cargo bed includes a welded chain having individual links structurally interconnected to form a rigid assembly of a center section spaced above the side walls and inclined end section attached to the sidewalls by mechanical fasteners or telescopic insertion into sidewall stake pockets.

11 Claims, 5 Drawing Sheets

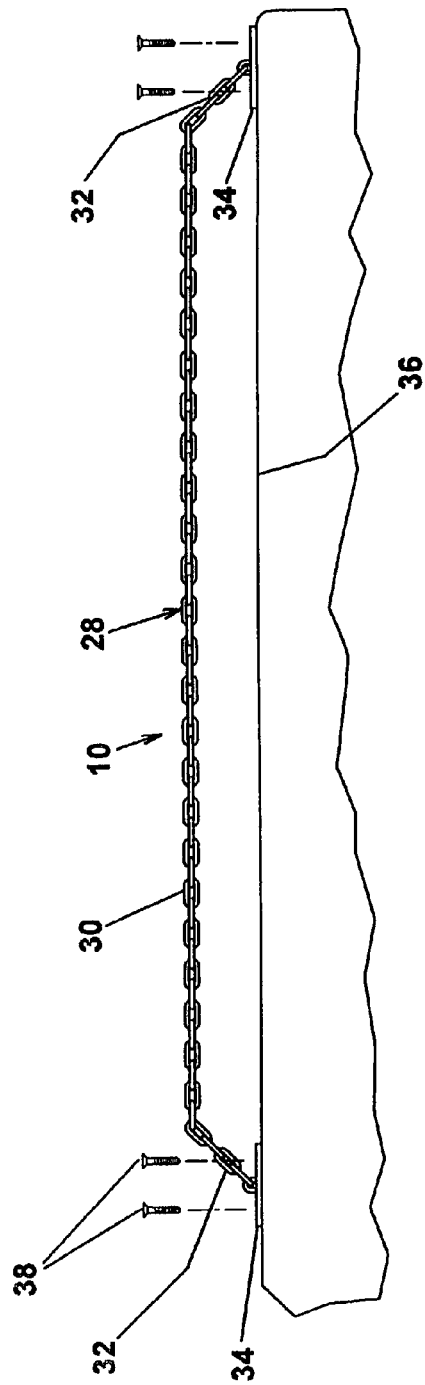
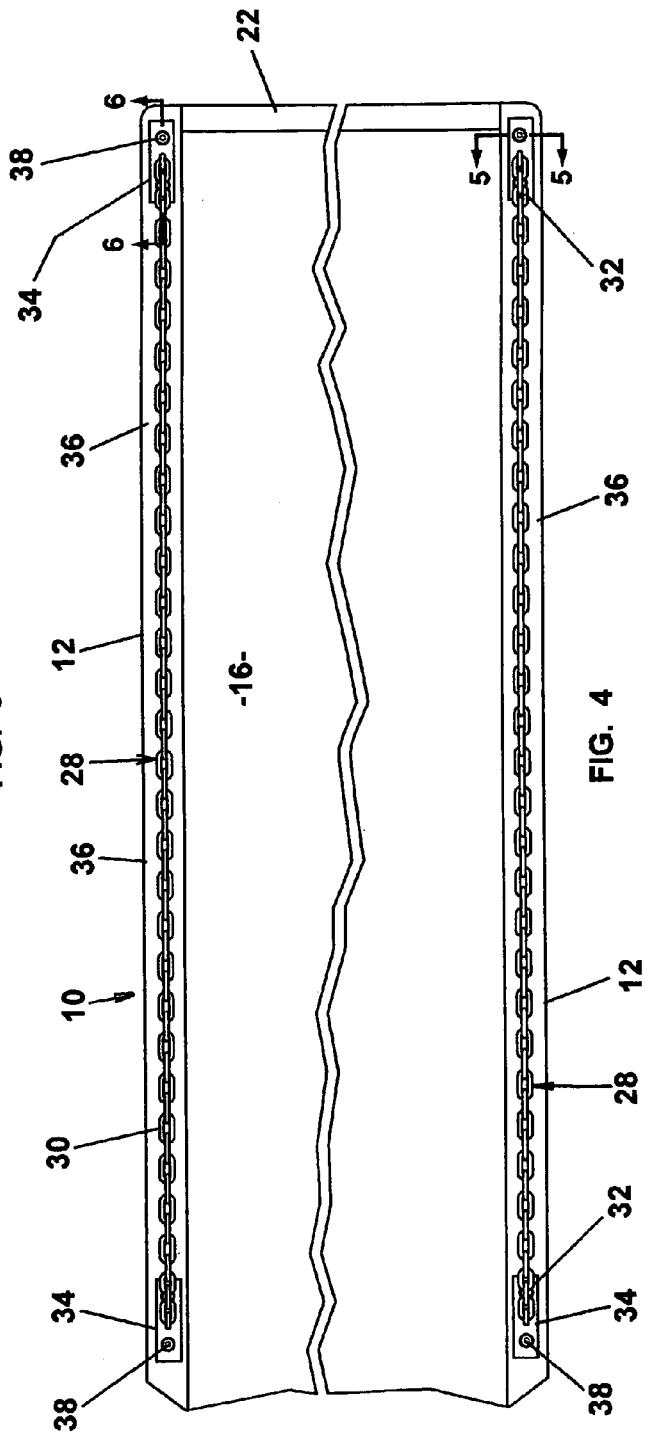

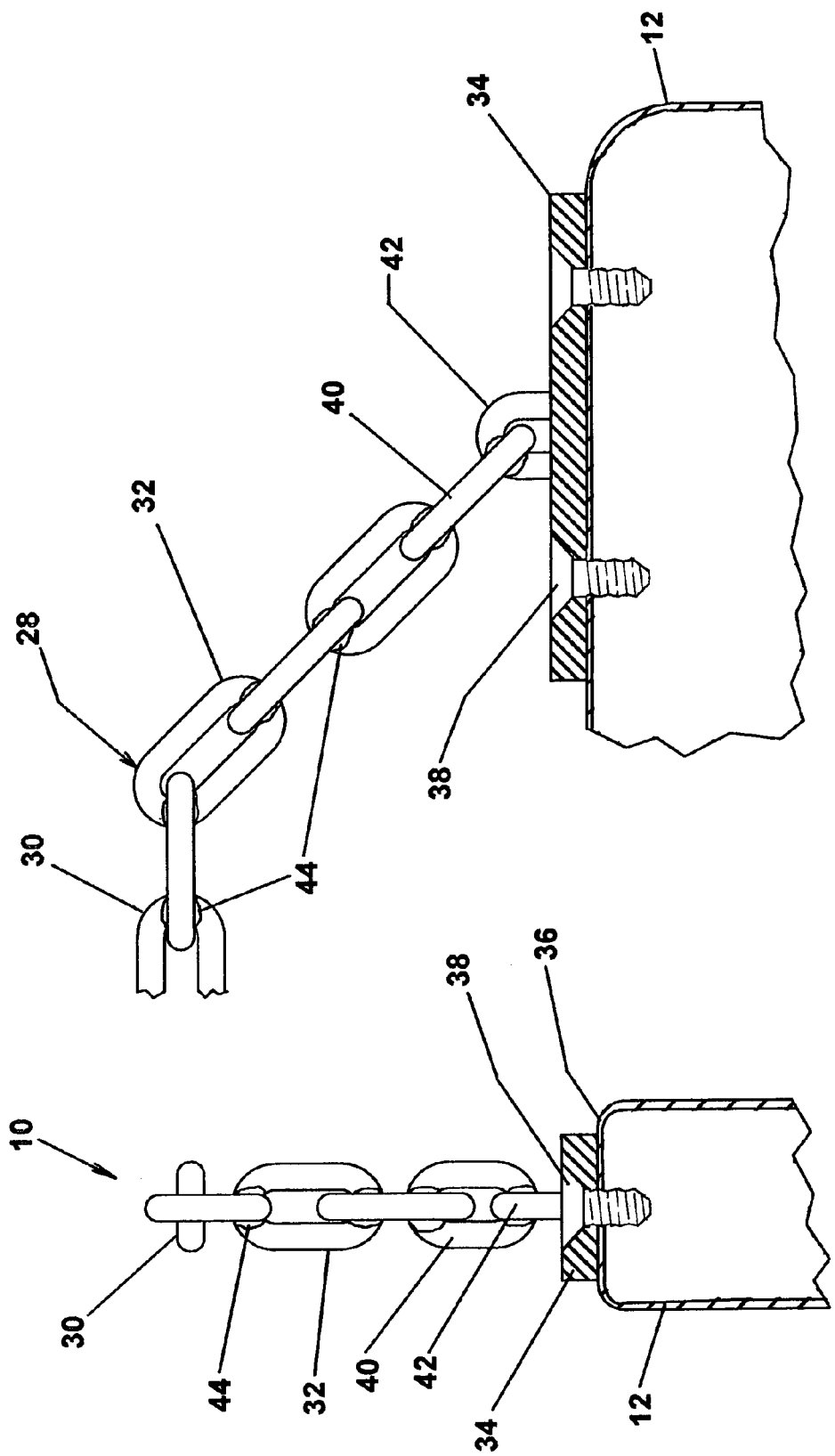

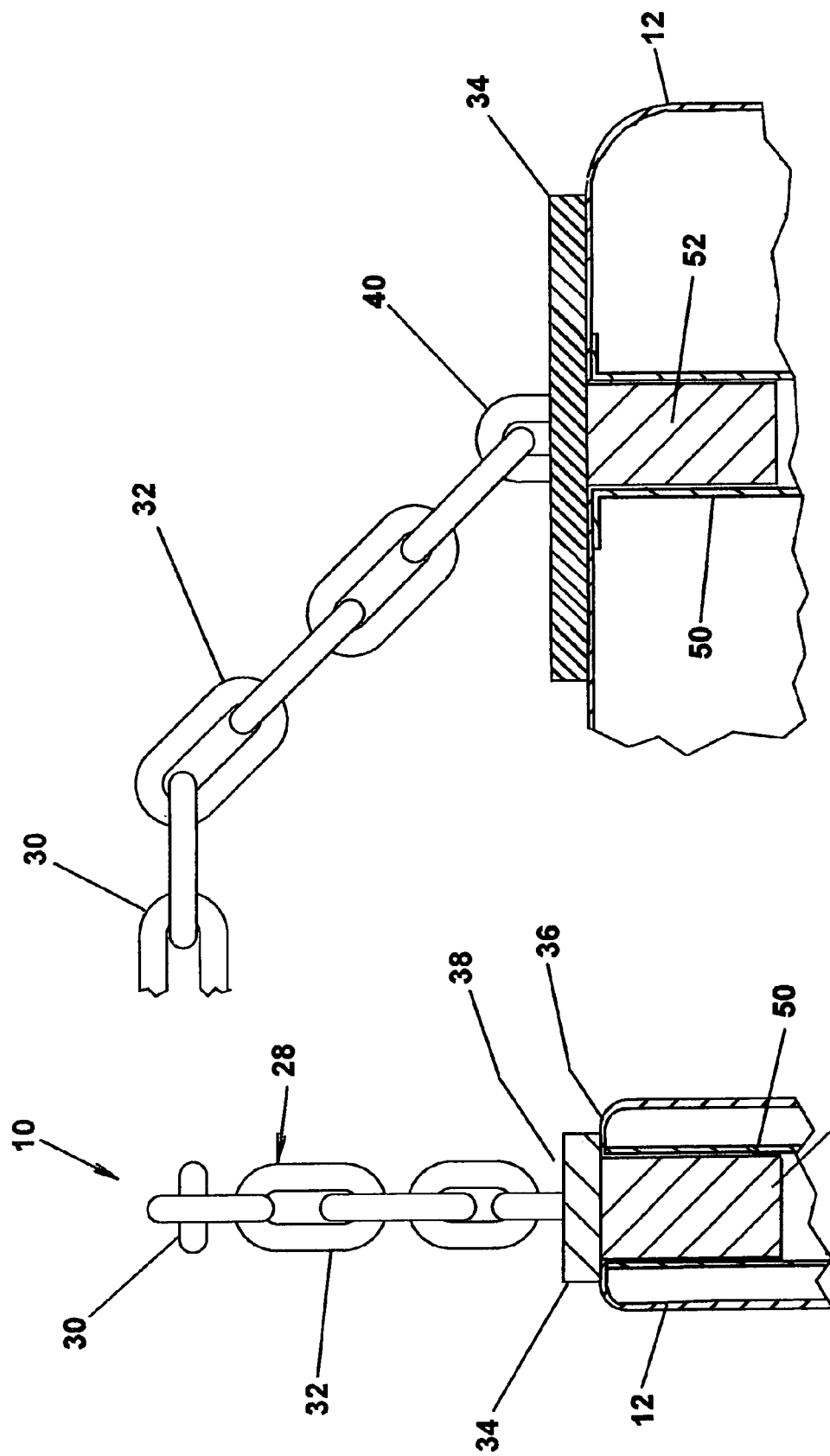

WELDED CHAIN TRUCK RAIL

FIELD OF THE INVENTION

The present invention relates generally to accessories for trucks and, in particular, to a truck rail for the side walls of a pickup truck cargo bed having welded chain links formed into an elongated rail mounted on the top surface of the side walls and adapted for mechanical or stake pocket attachment.

BACKGROUND OF THE INVENTION

Owners of pickup trucks commonly use accessories to increase the functionality and aesthetics of their vehicles. The cargo bed, in particular, has been a focus of owner attention. Bed liners are used for protection in hauling and facilitating removal of cargo. Metallic textured caps are available as sidewall and tailgate protectors. Bed mounted tool boxes provide for decorative and functional transportation of tools.

Structural and aesthetic truck rails are available in many designs for providing structural attachment locations for to lash cargo, support oversize loads and enhance the appearance of the truck. Such truck rails extend in opposed pairs along the top of the side walls, and are stake pocket or drill mounted thereon. Tubular truck rails are common and available in a variety of exterior finishes, generally including stainless steel, black paint or chrome plate as representatively disclosed in U.S. Pat. Nos. 5,997,227 to Bundy and 5,642,971 to Ragsdale. The tubular designs provide limited attaching locations for common cargo straps such as elastic straps with hooked ends, such as bungee straps. Tubular projections such as disclosed in U.S. Pat. No. 6,176,648 to Rowe and perforated bars as disclosed in United States Published Application No. 2002/0012576 to Anderson have been proposed for decorative as well as improved cargo lashing. While providing additional locations for tie-down systems, they are not particularly amenable to hooked lashings.

BRIEF SUMMARY OF THE INVENTION

The present invention provides a decorative and functional design for truck rails having the strong aesthetic appeal of chain links and utilizing the individual links as a multiplicity of regularly spaced attaching locations. The truck rails comprise a rail assembly having a series of structurally rigidly interconnected chain links that terminate with downwardly inclined ends that are attached to mounting plates that may be connected to the top of the side rails by drill and fastener mounting or by stake pocket insertion.

Accordingly, it is an object of the present invention to provide a decorative and functional truck bed rail for pickup trucks.

A further object is to provide a truck rail that provides an extended series of tie-down locations amenable to hooked lashing straps.

Another object of the invention is to provide a truck rail for pickup trucks incorporating the aesthetics of welded chain.

Yet another object of the invention is to provide truck rail having structurally rigidly interconnected chain links having mounting plates for mechanical or stake pocket mounting on pickup truck sidewalls.

DESCRIPTION OF THE DRAWINGS

The above and other features and advantages of the invention will become apparent upon reading the following detailed description taken in conjunction with the accompanying drawings in which:

FIG. 3 is a side view of the truck rails on the truck bed of FIG. 1;

FIG. 4 is a top view of the truck rails on the truck bed;

FIG. 5 is an enlarged fragmentary end view of the rail taken along line 5—5 in FIG. 4;

FIG. 6 is an enlarged fragmentary side view taken along line 6—6 in FIG. 4;

FIG. 7 is an enlarged end view similar to FIG. 5 of a truck rail mounted in the bed stake pocket according to another embodiment of the invention; and FIG. 8 is an enlarged fragmentary side view similar to FIG. 6 of the truck rail shown in FIG. 7.

DETAILED DESCRIPTION OF THE PREFERRED EMBODIMENTS

Figure 1:
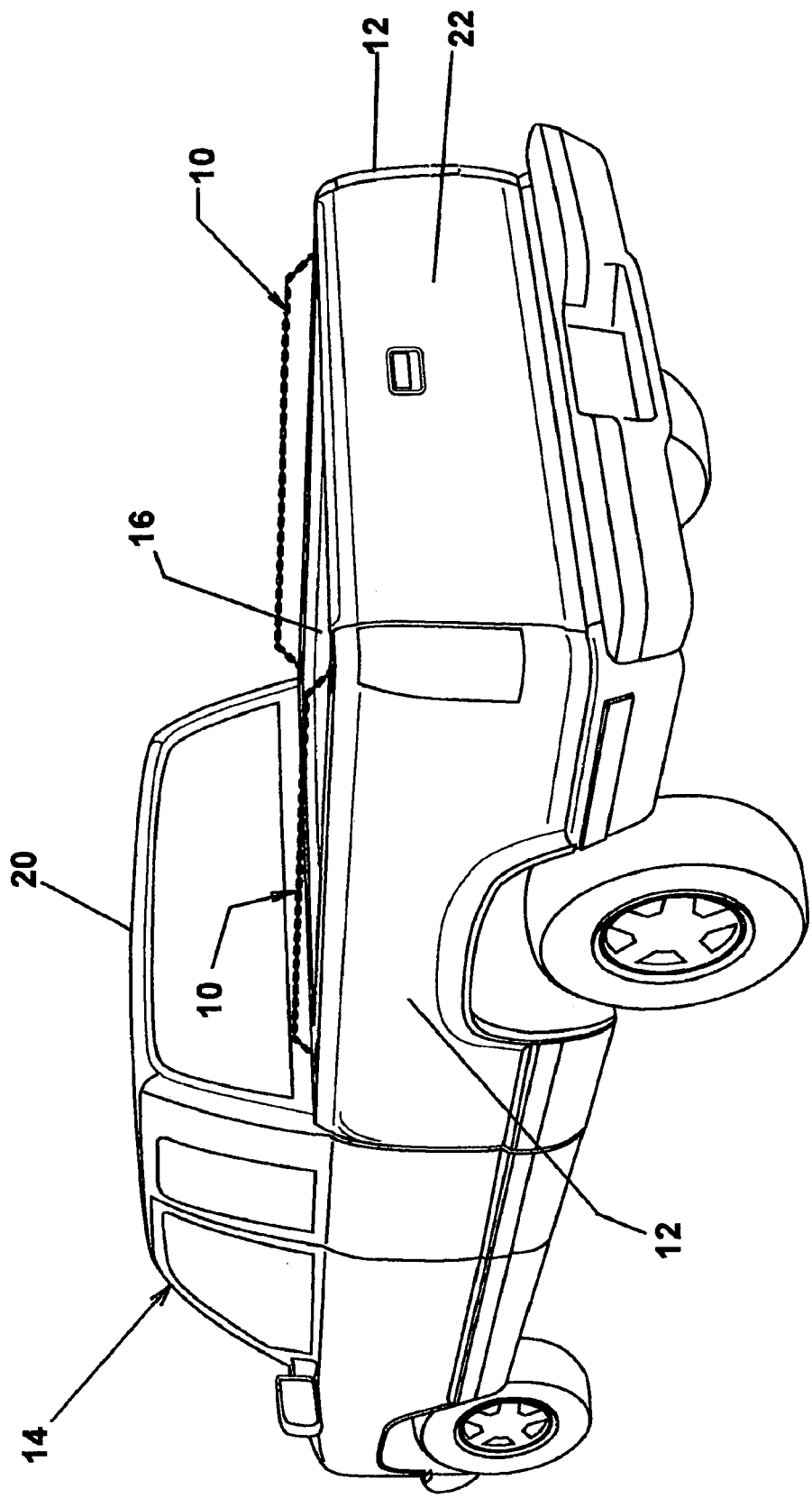
FIG. 1 is a rear perspective view of a welded chain truck rail mounted on the sidewalls of a truck bed in accordance with a preferred embodiment of the invention.
Figure 2:
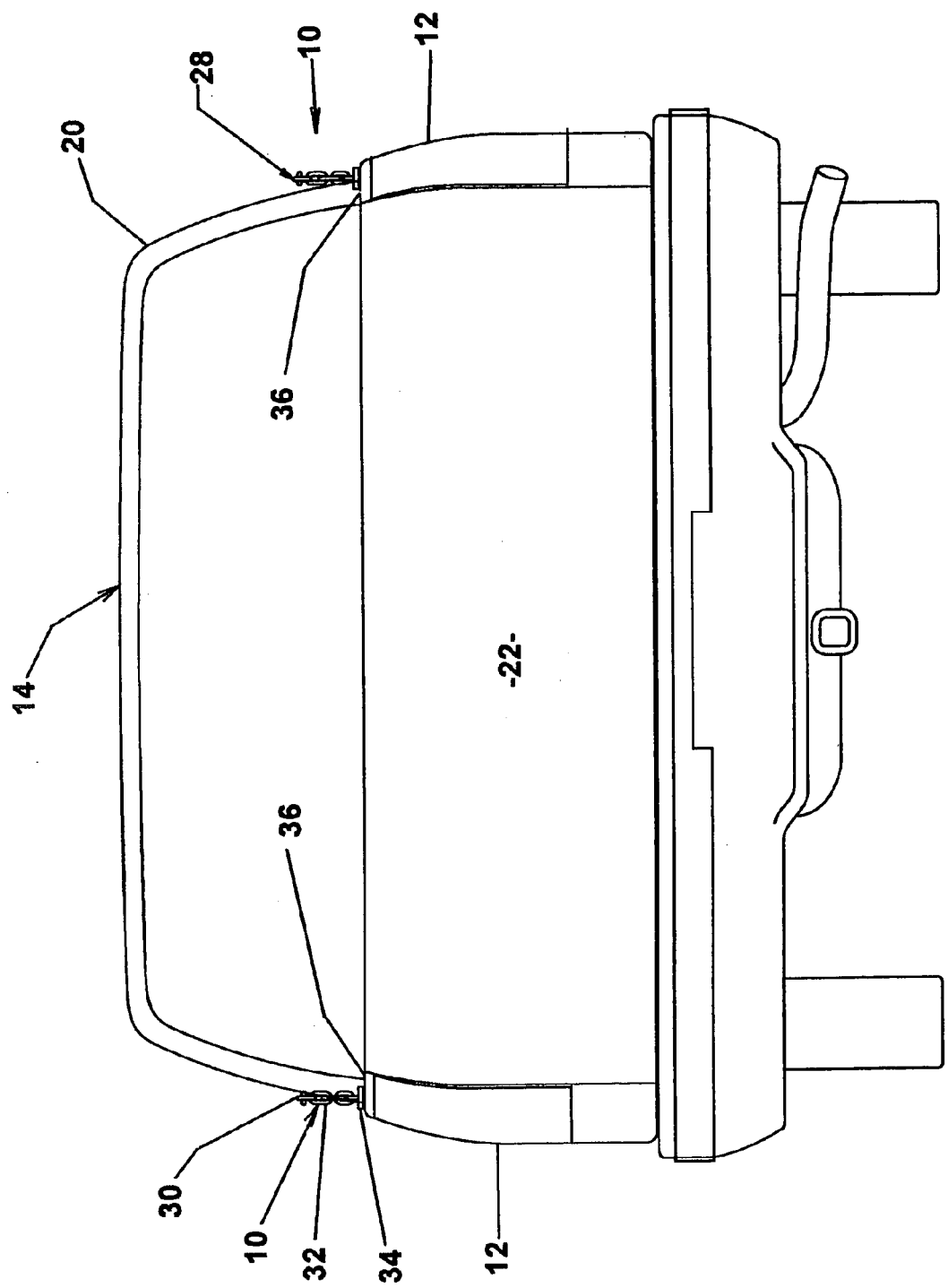
FIG. 2 is a fragmentary side elevational view of the truck rail of FIG. 1.

Referring to the drawings, FIG. 1 shows a pair of truck rails 10 mounted on top of the sidewalls 12 of a pickup truck 14 on opposite sides of a cargo bed 16. The truck rails 10 extend longitudinally along the top surface of the side walls 12 with one end adjacent the truck cab 20 and the other end adjacent the cargo tail gate 22. As described below, the truck rails 10 may be mechanically attached to the side walls 12 or mounted in existing stake pockets therein.

Referring additionally to FIGS. 3 and 4, the truck rails 10 are elongated welded chain assembly 28 including a horizontal center section 30 having downwardly and outwardly longitudinally inclined end sections 32 attached at lower ends to generally rectangular mounting plates 34. In the present embodiment, the mounting plates 34 are mechanically attached to the horizontal top surface 36 of the side walls 12 by threaded fasteners 38. As shown in FIGS. 5 and 6, the end links 40 of the end sections 32 are attached to the mounting plates 34 at half links 42.

The chain assembly 28 comprises conventional serially interconnected C-shaped links having juxtaposed ends welded together after assembly. Preferably, the chain assembly 28 is formed of heavy duty links. The links are preferably formed of ferrous material. Steel link chains may be plated or color coated after assembly. Stainless steel chain may also be used.

To form the chain assembly 28 the ends of the individual links are aligned and structurally interconnected at welds 44 to form a rigid assembly. The welds should have sufficient length to provide a multidirectional rigidity to the chain assembly sufficient for withstanding impacting and allowing the chain assembly to function as cargo restraint anchoring. At the end sections 32, the half link 42 is assembled to the end link 40 and the end section 32. The ends of the half link 42 are welded to the top surface of the mounting plate 34. Alternative connections to the mounting plate may be utilized, such as direct welding of the end link or mechanical or adapter connections. The length of the chain assembly 28 may vary according to customer preferences and vehicle make and configuration.

The mounting plate 34 is formed of metal plate and has a planar base surface that engages the upper surface 38 of the side wall 12. The mounting plate 34 is generally rectangular, although it will be appreciated that other profiles are compatible with mounting. The mounting plate may be finished compatibly with the finish of the chain assembly or complementary thereto. For the mechanical mounting of the present embodiment, a pair of vertical longitudinally spaced holes are formed therein for the flush reception of the head of the fasteners 38. The fasteners 38 may be self threaded into complementary holes in the sheet metal of the sidewalls 12. The attaching holes may be reinforced with expandable nuts or rivets for self threading or machine threaded fasteners and the like.

Referring to FIGS. 7 and 8, the mounting plate 34 may be appropriately adapted for use in truck models having vertical stake pockets 50 longitudinally spaced at top of the side walls 12. Therein, the mounting plate 28 is provided, integrally or supplementaly, with a downwardly depending adapter member 52 having a cross sectional configuration for telescopic reception in the pocket 50.

It will be further appreciated that the mounting plate may be adapted for direct connection with the ends of the center section 30 using sleeve connections as employed with tubular side rail designs. Further, intermediate supports may be provided for the chain assembly at periodic locations if further reinforcement is desired.

The foregoing embodiments provide rigid and decorative truck rails for enhancing the appearance of the truck in a variety of finishes. The chain links are also convenient periodic attaching points for hooked lashings and other cargo restraints.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed:

1. A truck rail for use with a pickup truck having a cargo bed and laterally spaced sidewalls, comprising: a pair of mounting plates for mounting at spaced locations on the top of the sidewalls; an elongated welded link chain having adjacent links welded together to form a lineal length of rigidly interconnected links; means at the ends of said chain for connection with said mounting plates for locating said chain in vertically spaced relation above and parallel to the top of the sidewalls.

2. The truck rail as recited in claim 1 wherein said means at the ends of said chain includes an end section of downwardly extending chain links connected with said ends of said chain and welded to said mounting plates.

3. The truck rail as recited in claim 2 wherein each end link of said end section is connected to said mounting plate at a half link welded to the top surface of said mounting plate.

4. The truck rail as recited in claim 2 wherein said end section is downwardly inclined between said ends of said chain and said mounting plate.

5. The truck rail as recited in claim 2 wherein said mounting plates include apertures for receiving mechanical fasteners for attaching said mounting plates to the tops of the sidewalls.

6. The truck rail as recited in claim 2 wherein the pickup truck is provided with longitudinally spaced upwardly opening stake pockets at the tops of the side walls and said mounting plates include a downwardly depending adapter member for telescopic insertion into the pockets for mounting the truck rail on the pickup truck.

7. The truck rail as recited in claim 2 wherein said links are chrome plated.

8. The truck rail as recited in claim 2 wherein said links are color coated.

9. The truck rail as recited in claim 2 wherein said links are formed of stainless steel.

10. The truck rail as recited in claim 1 wherein said chain comprises a length of C-shaped, serially interconnected links having juxtaposed ends welded after assembly.

11. In combination; a pickup truck having a rear cargo bed laterally bounded by side walls having longitudinally extending horizontal top surfaces; pairs of longitudinally spaced mounting plates attached in symmetrical opposed relation on said top surfaces; rail members structurally connected between each pair of mounting plates and including end sections upwardly and inwardly inclined normal to said top surface of a sidewall and interconnected by a center section parallel to said top surface wherein said end sections and said center section each include a plurality of rigidly structurally interconnected chain links.

* * * * *